(12) United States Patent
Groen et al.

(10) Patent No.: US 11,433,738 B2
(45) Date of Patent: Sep. 6, 2022

(54) VEHICLE THERMAL MANAGEMENT

(71) Applicant: GM Global Technology Operations LLC, Detroit, MI (US)

(72) Inventors: Benjamin C. Groen, Troy, MI (US); Cameron P. Smith, Milford, MI (US); Kyle Holihan, South Lyon, MI (US); Michael H. Carlson, Farmington Hills, MI (US); Nathan J. English, Auburn Hills, MI (US); Lawrence P. Ziehr, Clarkston, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 162 days.

(21) Appl. No.: 16/890,146

(22) Filed: Jun. 2, 2020

(65) Prior Publication Data

US 2021/0370748 A1    Dec. 2, 2021

(51) Int. Cl.
   *B60H 1/32*       (2006.01)
   *B60H 1/00*       (2006.01)
   *B60H 1/22*       (2006.01)

(52) U.S. Cl.
   CPC ....... *B60H 1/3211* (2013.01); *B60H 1/00807* (2013.01); *B60H 1/00885* (2013.01); *B60H 1/2221* (2013.01); *B60H 2001/3242* (2013.01); *B60H 2001/3264* (2013.01); *B60H 2001/3267* (2013.01); *B60H 2001/3288* (2013.01)

(58) Field of Classification Search
   CPC ............. B60H 1/3211; B60H 1/00807; B60H 1/00885; B60H 1/2221; B60H 2001/3242; B60H 2001/3264; B60H 2001/3267; B60H 2001/3288
See application file for complete search history.

(56) References Cited

U.S. PATENT DOCUMENTS

| | | | | |
|---|---|---|---|---|
| 6,035,651 | A * | 3/2000 | Carey ................... | F25B 41/315 62/115 |
| 2012/0222438 | A1* | 9/2012 | Osaka ..................... | B60L 58/26 62/126 |
| 2019/0176578 | A1* | 6/2019 | Blatchley ........... | B60H 1/00385 |
| 2020/0313255 | A1* | 10/2020 | Wu ..................... | H01M 10/625 |

* cited by examiner

*Primary Examiner* — Marc E Norman
(74) *Attorney, Agent, or Firm* — Cantor Colburn LLP

(57) ABSTRACT

A thermal management method and system in a vehicle include a chiller to cause heat transfer between a coolant loop that defines a path in which a coolant circulates and a refrigerant loop that defines a path in which a refrigerant circulates. The system includes an electronic expansion valve (EXV) in the refrigerant loop to control a flow of the refrigerant into a first part of the chiller, and a coolant pump in the coolant loop to control a flow of the coolant into a second part of the chiller. A controller controls the EXV and the coolant pump based on a target amount for the heat transfer.

16 Claims, 3 Drawing Sheets

VEHICLE THERMAL MANAGEMENT

INTRODUCTION

The subject disclosure relates to vehicle thermal management.

Vehicles (e.g., automobiles, trucks, construction equipment, farm equipment, automated factory equipment) include components that generate heat as well as components that require heat. The heat may be used in heat transfer devices that serve different functions. In vehicles with one or more occupants, a heat transfer device may be used to manage the temperature and humidity in the passenger compartment, for example. Accordingly, it is desirable to provide vehicle thermal management.

SUMMARY

In one exemplary embodiment, a thermal management system in a vehicle includes a chiller to cause heat transfer between a coolant loop that defines a path in which a coolant circulates and a refrigerant loop that defines a path in which a refrigerant circulates. The system also includes an electronic expansion valve (EXV) in the refrigerant loop to control a flow of the refrigerant into a first part of the chiller, and a coolant pump in the coolant loop to control a flow of the coolant into a second part of the chiller. A controller controls the EXV and the coolant pump based on a target amount for the heat transfer.

In addition to one or more of the features described herein, the target amount is based on an input to a heating, ventilation, and air conditioning (HVAC) system in the refrigerant loop from an occupant of the vehicle and on an ambient temperature outside the vehicle.

In addition to one or more of the features described herein, the controller determines whether a current amount of heat transfer in the chiller is less than the target amount.

In addition to one or more of the features described herein, based on the controller determining that the current amount of heat transfer in the chiller is not less than the target amount, the controller determines if the coolant pump is configured to maximize the flow of the coolant into the second part of the chiller and if a superheat value is less than a maximum superheat value. The superheat value is a temperature increase of the refrigerant in a vapor phase and the maximum superheat value being a predefined value.

In addition to one or more of the features described herein, based on determining that the current amount of heat transfer in the chiller is greater than the target amount and the superheat value is less than the maximum superheat value, the controller controls the EXV to reduce the flow of the refrigerant into the first part of the chiller.

In addition to one or more of the features described herein, based on determining that the current amount of heat transfer in the chiller is not greater than the target amount or the superheat value is not less than the maximum superheat value, the controller controls the coolant pump to reduce the flow of the coolant into the second part of the chiller and to control the EXV to bring the superheat value within a predefined range. A maximum value of the predefined range is less than the maximum superheat value.

In addition to one or more of the features described herein, based on the controller determining that the current amount of heat transfer in the chiller is less than the target amount, the controller controls the EXV to bring a superheat value within a predefined range. The superheat value is a temperature increase of the refrigerant in a vapor phase.

In addition to one or more of the features described herein, the controller determines if the target amount for the heat transfer is less than a maximum potential heat transfer amount. The maximum potential heat transfer amount is a maximum potential amount of waste heat in the coolant loop that transfers heat to the coolant.

In addition to one or more of the features described herein, based on determining that the target amount for the heat transfer is less than the maximum potential heat transfer amount, the controller controls the coolant pump to increase the flow of coolant into the second part of the chiller and to then bring the superheat value within the predefined range.

In addition to one or more of the features described herein, based on determining that the target amount for the heat transfer is not less than the maximum potential heat transfer amount, the controller controls an electric heat source to transfer heat to the coolant.

In another exemplary embodiment, a method includes obtaining a passenger cabin temperature setting, and determining a target output for a chiller based on the temperature setting. The target output is a target thermal energy transfer amount in a chiller from a coolant that circulates in a coolant loop to a refrigerant that circulates in a refrigerant loop. The method also includes controlling an electronic expansion valve (EXV) in the refrigerant loop that controls a flow of the refrigerant into a first part of the chiller and a coolant pump in the coolant loop that controls a flow of the coolant into a second part of the chiller based on the target output.

In addition to one or more of the features described herein, the determining the target output is based on an input to a heating, ventilation, and air conditioning (HVAC) system in the refrigerant loop from an occupant of the vehicle and on an ambient temperature outside the vehicle.

In addition to one or more of the features described herein, the method also includes determining whether a current amount of heat transfer in the chiller is less than the target output.

In addition to one or more of the features described herein, the method also includes, based on the determining that the current amount of heat transfer in the chiller is not less than the target output, determining if the coolant pump is configured to maximize the flow of the coolant into the second part of the chiller and if a superheat value is less than a maximum superheat value. The superheat value is a temperature increase of the refrigerant in a vapor phase and the maximum superheat value is a predefined value.

In addition to one or more of the features described herein, the method also includes, based on determining that the current amount of heat transfer in the chiller is greater than the target output and the superheat value is less than the maximum superheat value, controlling the EXV to reduce the flow of the refrigerant into the first part of the chiller.

In addition to one or more of the features described herein, the method also includes, based on determining that the current amount of heat transfer in the chiller is not greater than the target output or the superheat value is not less than the maximum superheat value, controlling the coolant pump to reduce the flow of the coolant into the second part of the chiller and to control the EXV to bring the superheat value within a predefined range. A maximum value of the predefined range is less than the maximum superheat value.

In addition to one or more of the features described herein, the method also includes, based on the controller determining that the current amount of heat transfer in the chiller is less than the target output, controlling the EXV to bring a superheat value within a predefined range, the superheat value being a temperature increase of the refrigerant in a vapor phase.

In addition to one or more of the features described herein, the method also includes determining if the target output is less than a maximum potential heat transfer amount, the maximum potential heat transfer amount being a maximum potential amount of waste heat in the coolant loop that transfers heat to the coolant.

In addition to one or more of the features described herein, the method also includes, based on determining that the target output is less than the maximum potential heat transfer amount, controlling the coolant pump to increase the flow of coolant into the second part of the chiller and bringing the superheat value within the predefined range.

In addition to one or more of the features described herein, the method also includes, based on determining that the target output is not less than the maximum potential heat transfer amount, controlling an electric heat source to transfer heat to the coolant.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
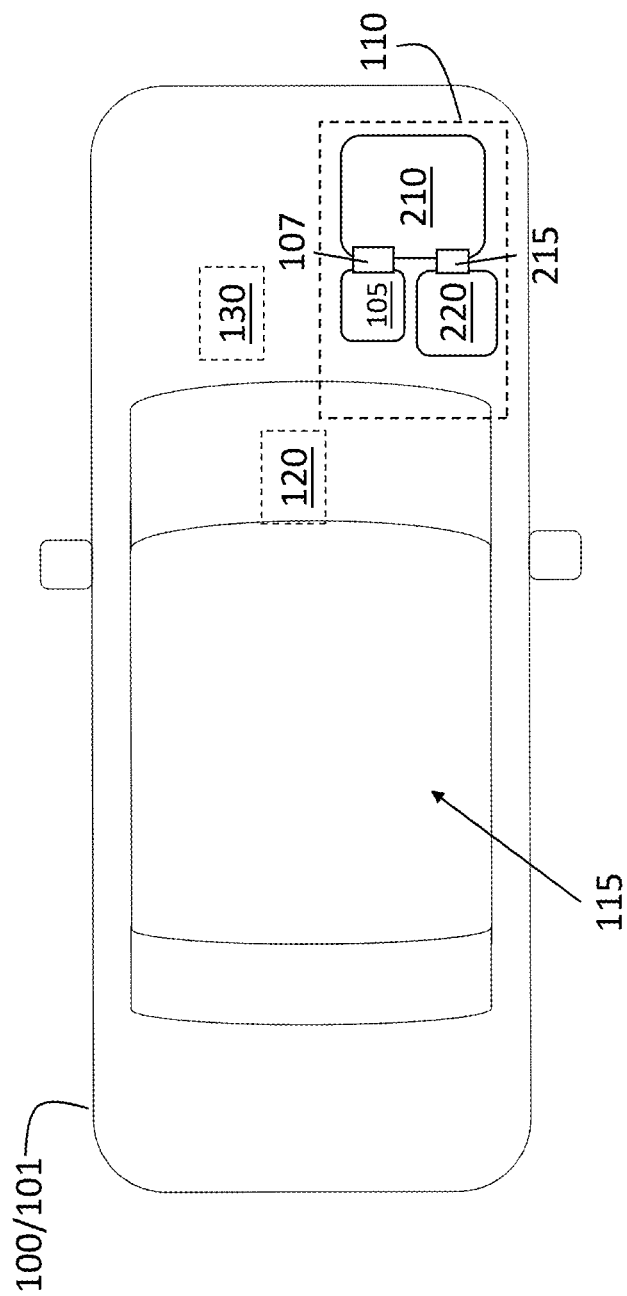
FIG. 1 is a block diagram of an exemplary vehicle in which thermal management is implemented according to one or more embodiments.

The following description is merely exemplary in nature and is not intended to limit the present disclosure, its application or uses. It should be understood that throughout the drawings, corresponding reference numerals indicate like or corresponding parts and features.

As previously noted, vehicles include both heat-generating components and those that use the heat in a heat transfer device. The passenger cabin temperature management, for example, employs a heat transfer device that requires heat to produce the requisite phase change. A significant percentage of the output of a traditional internal combustion engine is in the form of heat. However, this waste heat is less readily available in a hybrid or electric vehicle (EV) due to their increased efficiency. Other exemplary sources of waste heat in an EV include resistive loses of power electronics. Embodiments of the systems and methods detailed herein relate to vehicle thermal management. That is, the waste heat generated by batteries and other sources in hybrid or electric vehicles may be stored for use by the components of the vehicle that require it. The efficient use of the stored waste heat prevents having to use electrical power to generate heat when needed.

A thermal system architecture has been developed to collect, store, and distribute thermal energy to vehicle systems that need the energy. The architecture includes three thermal fluid loops: a coolant loop that defines a path in which coolant circulates, a drive unit oil loop that defines a path in which transmission oil circulates, and a refrigerant loop that defines a path in which refrigerant circulates. The coolant loop interacts with both the drive unit oil loop and the refrigerant loop. Embodiments detailed herein pertain to the interaction of the coolant loop and the refrigerant loop and, specifically, to a chiller at the intersection of these loops. The chiller uses the coolant to condition the refrigerant that is then used in the heating, ventilation, and air conditioning (HVAC) system that controls the cabin air.

In accordance with an exemplary embodiment, FIG. 1 is a block diagram of a vehicle 100 in which thermal management is implemented. The exemplary vehicle 100 shown in FIG. 1 is an automobile 101. The thermal management system 110 that includes the three previously noted thermal fluid loops is indicated. Specifically, a coolant loop 210 interacts with both a refrigerant loop 220 and a drive unit oil loop 105. A transmission oil cooler 107 is at an intersection of the coolant loop 210 and the drive unit oil loop 105, and a chiller 215 is at an intersection of the coolant loop 210 and the refrigerant loop 220. An occupant interface 120 (e.g., infotainment system) facilitates selections by an occupant of the vehicle 100 in the passenger compartment 115. The input may be a desired temperature for the passenger compartment 115, for example. The inputs to the occupant interface 120 may be implemented through a controller 130 (e.g., electronic control unit (ECU)) of the vehicle 100.

The controller 130 may control aspects of the thermal management system 110 as well as other operations of the vehicle 100. For example, the controller 130 may implement autonomous or semi-autonomous (e.g., automatic braking, adaptive cruise control) operation based on interaction with other systems of the vehicle 100. Based on an input the occupant interface 120 (e.g., a temperature selection), the controller 130 may control aspects of the thermal management system 110, as further discussed with reference to FIGS. 2 and 3. The controller 130 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
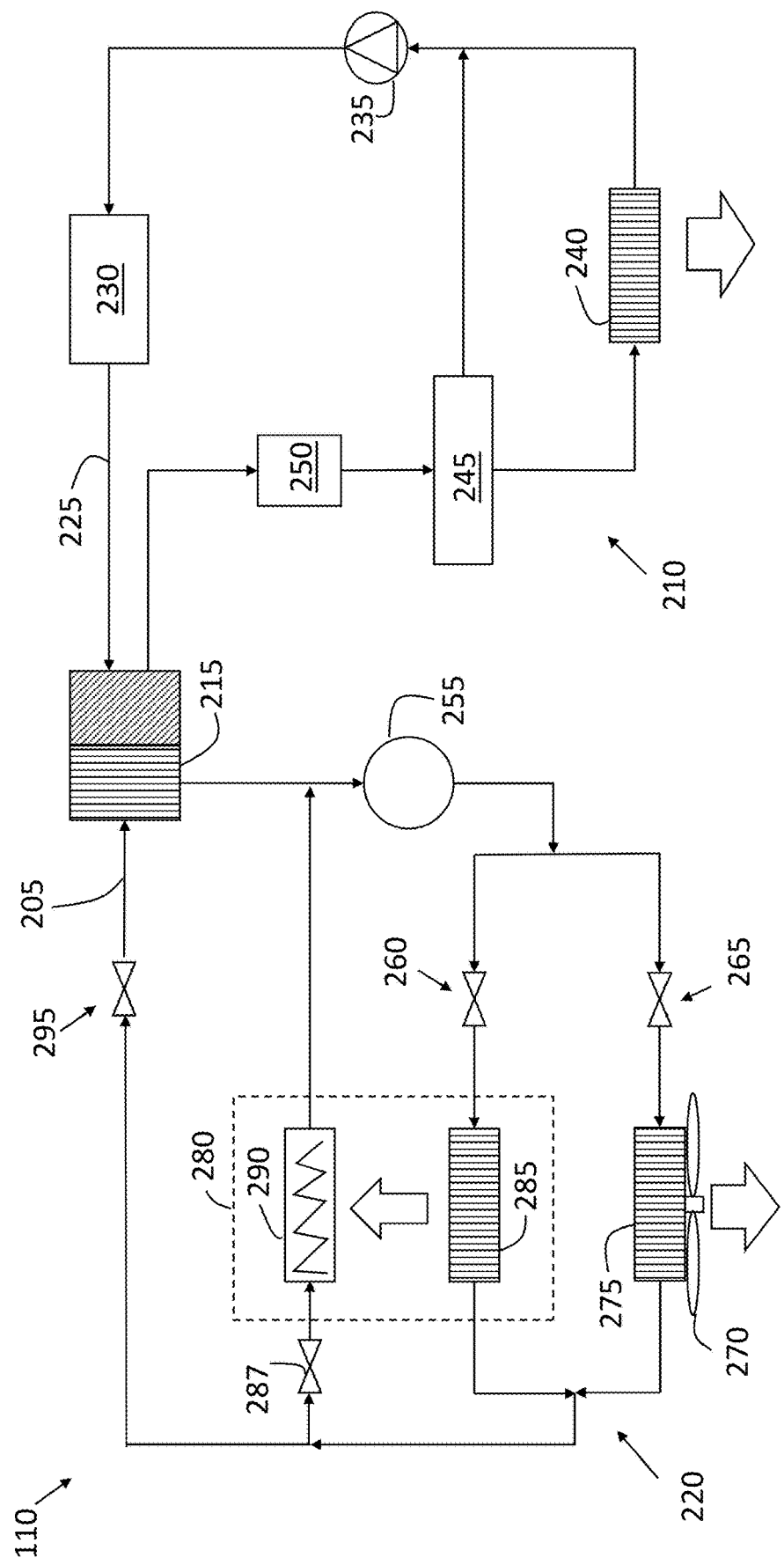
FIG. 2 is a block diagram of aspects of the thermal management system that is controlled according to one or more embodiments.

FIG. 2 is a block diagram of aspects of the thermal management system 110 that is controlled according to one or more embodiments. The control may be provided by the controller 130 or another controller that is specific to the thermal management system 110 and includes processing circuitry similar to that discussed with reference to the controller 130. Relevant aspects of the coolant loop 210 and the refrigerant loop 220 are shown. Details of the drive unit oil loop 105 and the aspects of the coolant loop 210 that interact with it are not shown. For example, the coolant loop 210 may include an integrated power electronic module with accessories (e.g., high voltage supply, navigation system, heated seat system) or an onboard charging module that moves energy into a secondary cell or rechargeable battery 250. As shown, the coolant loop 210 includes a battery 250 for the drivetrain and other drivetrain components 245 that may generate waste heat. A radiator 240 may transfer heat to the outside of the vehicle 100 when too much waste heat is generated to be stored. A coolant pump 235 may be controlled to selectively pump coolant 225 that is heated by the waste heat as it flows to the coolant pump 235 in the coolant loop 210. Exemplary, non-limiting coolants 225 include water and glycol. As further discussed, the processes shown in FIG. 3 ensure the necessary balance of coolant 225 and refrigerant 205 in the chiller 215 for a required chiller load without dissipating more waste heat than necessary. As a result, these processes preclude or at least minimize the use of the electrically powered heater 230.

As previously noted, a chiller 215 is at an intersection of the coolant loop 210 and the refrigerant loop 220 and acts as a heat exchange device between the two. The coolant 225 pumped by the coolant pump 235 is input to one side of the chiller 215. Refrigerant 205 is input to another side of the chiller 215. Exemplary, non-limiting refrigerants 205 include hydrofluorocarbon (HFC-134a) or hydrofluoroolefin (HFO-1234yf). The coolant 225 and refrigerant 205 do not mix in the chiller 215, but the flow of each through the separate sides allows the refrigerant loop 220 to carry thermal energy to or from the coolant loop 210 via the chiller 215. As previously noted, the flow rate of coolant 225 into the chiller 215 is controlled via the coolant pump 235. The flow rate of refrigerant 205 into the chiller 215 is controlled via an electronic expansion valve (EXV) 295. The method by which the coolant pump 235 and EXV 295 are controlled is detailed with reference to FIG. 3.

The refrigerant loop 220 includes an HVAC system 280 that provides heated or cooled air to the passenger compartment 115. The HVAC system 280, which is an air conditioner in which both heating and cooling functions are possible, includes a condenser 285 and an evaporator 290. An EXV 287 controls the flow of refrigerant into the evaporator 290. The refrigerant loop 220 also includes an exterior condenser 275 with a fan 270. The fan 270 may be shared with the radiator 240. Refrigerant 205 from the chiller 215 enters a compressor 255. The compressor increases the pressure and temperature of the refrigerant 205. This higher-temperature and higher-pressure refrigerant 205 may enter the condenser 285 of the HVAC system 280, the exterior condenser 275, or both based on control of the variable refrigerant flow valves (RFVs) 260, 265. The exterior condenser 275 is used to transfer excess heat to the outside of the vehicle 100.

When the ambient temperature outside the vehicle 100 is very cold and heat is requested in the passenger compartment 115, the evaporator 290 of the HVAC system 280 may not be operated. When the ambient temperature is very hot and dry, the condenser 285 of the HVAC system 280 may not be operated. However, at milder ambient temperatures and to balance humidity in the passenger compartment 115, both the condenser 285 and the evaporator 290 may be operated.

Figure 3:
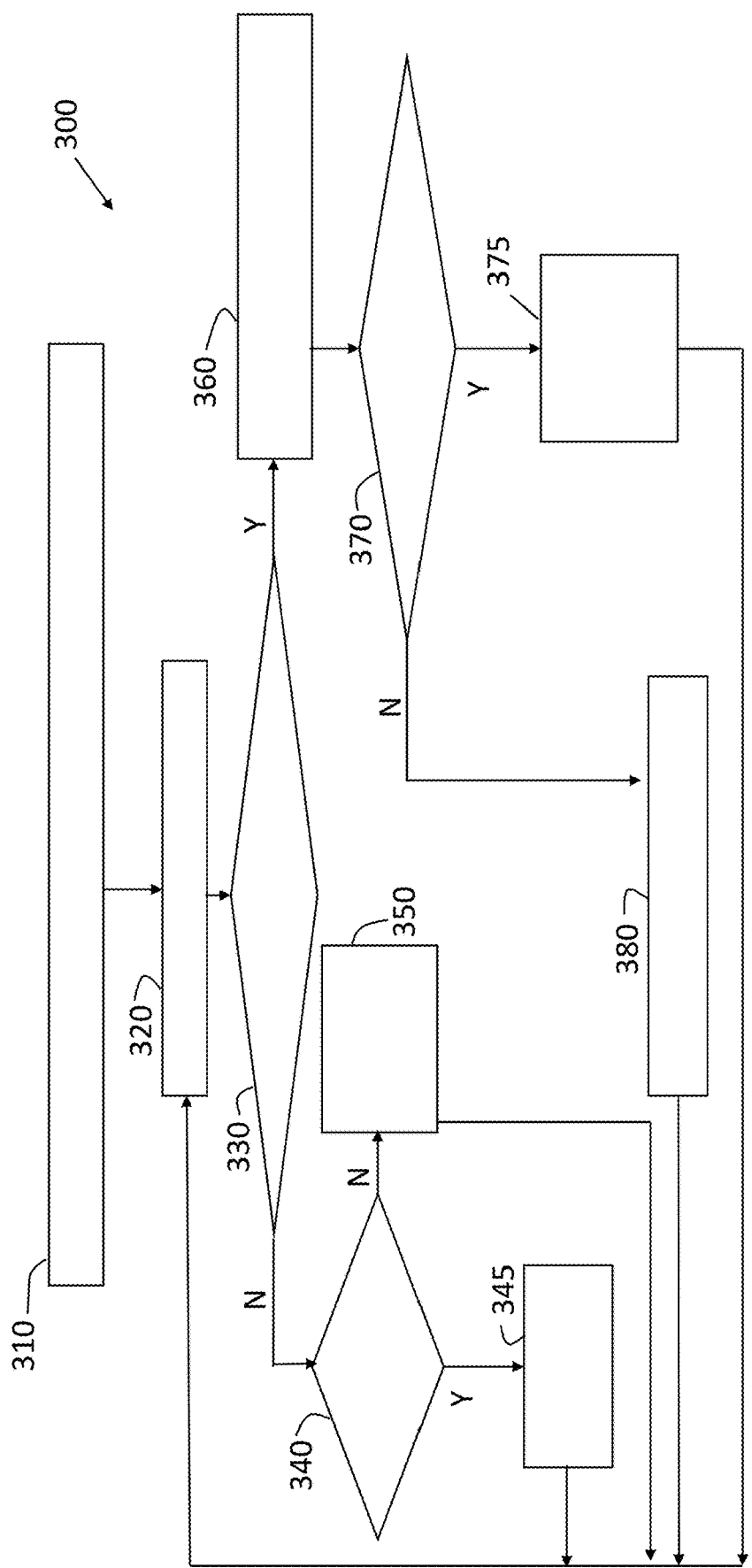
FIG. 3 is a process flow of a method of controlling the thermal management system according to one or more embodiments.

FIG. 3 is a process flow of a method 300 of controlling the thermal management system 110 according to one or more embodiments. Specifically, a process flow to control the EXV 295 and the coolant pump 235 to respectively control the flow of refrigerant 205 and coolant 225 into the chiller 215 is detailed according to exemplary embodiments. At block 310, factors that affect the desired chiller output are considered. Exemplary factors include a setting or change in setting of the desired cabin air temperature by an occupant of the vehicle 100 and the outside temperature. The occupant may use the occupant interface 120 to enter or change a desired temperature for the passenger compartment 115.

At block 320, computing the target output refers to determining the goal for which the inputs into the chiller 215 will be controlled. According to an exemplary embodiment, the target output may be a chiller load, which is the thermal energy (e.g., in kilowatts) that must be transferred from the coolant 225 to the refrigerant 205 in the chiller 215. Determination of the chiller load is a known computation that is generally based on the difference between the current and the desired temperatures in the passenger compartment 115 and the temperature of the coolant 225, among other factors. Exemplary additional factors include a setting of the fan speed for air entering the passenger compartment 115 and where it is directed (e.g., feet, defrost), whether the setting is for recirculating or fresh air, and humidity outside the vehicle 100. A given desired temperature setting results in a determination of both heat and cool needed to achieve the temperature while controlling humidity in the passenger compartment 115.

At block 330, a check is done of whether the current output is less than the target output. If the check at block 330 indicates that the current output (e.g., chiller load) meets or exceeds the target output, then the process of decreasing the output begins with a check at block 340. Allowing the current output to remain above the target output uses waste heat that is transferred to the coolant 225 unnecessarily and also may cause issues with superheat. The superheat term refers to how much the temperature of the refrigerant 205 exceeds the minimum temperature needed to achieve a vapor phase. If the superheat were 0 degrees, it means that only the minimum heat transfer needed to cause the phase change of the refrigerant 205 in the chiller 215 was used. That is, a positive superheat value is the temperature increase of the refrigerant 205 in the vapor phase. Keeping the superheat below a threshold value facilitates controlling excess heat transfer in the chiller 215. A high superheat indicates not only inefficient operation of the refrigerant system but also overheating of the hardware of the compressor 255. Throughout the period when the processes of the method 300 are performed, the superheat is monitored.

At block 340, if the coolant pump 235 is set such that the flow of coolant 225 is maximized and if the superheat is below a maximum defined value (e.g., 40 degrees), then the EXV 295 is closed at block 345. Closing the EXV 295, at block 345, refers to decreasing the flow rate of refrigerant 205 into the chiller 215. This will result in decreased output (i.e., less heat transfer from the coolant 225 to the refrigerant 205) but will also result in an increase in superheat. After the EXV 295 is controlled to reduce the flow rate of refrigerant 205 at block 345, the processes are repeated from block 320 with computing the target output. If any factors provided from block 310 have changed, the target output value will change at block 320 for the next iteration.

If the check at block 340 indicates that the flow rate of coolant 225 is not maximum, the superheat is not below a predefined minimum value, or both, then, at block 350, the processes include closing the coolant pump 235 and ensuring that the superheat is within a predefined range. Closing the coolant pump 235 refers to reducing the flow rate of coolant 225 and has the effect of decreasing both the output of the chiller 215 and decreasing the superheat. The predefined range for superheat may be on the order of 0 to 10 degrees, for example, and is below the maximum superheat value referred to with reference to block 340. The process of ensuring that the superheat is within the range, at block 350, is a closed-loop process involving iteratively adjusting the EXV 295 and rechecking the resulting superheat value. Once the flow rate of the coolant 225 has been reduced and the superheat is within the predefined range, at block 350, the processes are repeated starting at block 320.

If the check at block 330 indicates that the current output (e.g., chiller load) is below the target output, then the process of increasing the output begins at block 360. At block 360, the superheat is brought into the predefined range. As noted with reference to block 350, the process of ensuring that the superheat is within range involves iteratively adjusting the EXV 295 while rechecking the superheat. Once the superheat is brought within the predefined range, a check is done at block 370 of whether the target output is less than the maximum potential output. The maximum potential output is the maximum amount of waste heat that could be drawn from storage and, thus, the maximum potential heat transfer from the coolant 225 to the refrigerant 205 at the chiller 215.

If the check at block 370 indicates that the target output is more than the maximum potential output, it indicates that waste heat alone is insufficient to achieve the needed output from the chiller 215. In this case, using the electric heat source at block 380 becomes necessary. The process of using the electric heat source at block 380 is followed by a return to determining the target output at block 320.

If the check at block 370 indicates that the target output is less than the maximum potential output, it indicates that waste heat alone may be sufficient to achieve the needed output from the chiller 215. In this case, the processes at block 375 are performed. Specifically, the coolant pump 235 is opened such that flow rate of the coolant 225 is increased. Then the previously discussed iterative process to ensure that the superheat is within the predefined range is performed before returning to a computation of target output at block 320.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A thermal management system in a vehicle comprising:
  a chiller configured to cause heat transfer between a coolant loop that defines a path in which a coolant circulates and a refrigerant loop that defines a path in which a refrigerant circulates;
  an electronic expansion valve (EXV) in the refrigerant loop configured to control a flow of the refrigerant into a first part of the chiller;
  a coolant pump in the coolant loop configured to control a flow of the coolant into a second part of the chiller; and
  a controller configured to control the EXV and the coolant pump based on a target amount for the heat transfer, wherein the controller is configured to determine whether a current amount of heat transfer in the chiller is less than the target amount and, based on the controller determining that the current amount of heat transfer in the chiller is less than the target amount, the controller is configured to control the EXV to bring a superheat value within a predefined range, the superheat value being a temperature increase of the refrigerant in a vapor phase.

2. The system according to claim 1, wherein the target amount is based on an input to a heating, ventilation, and air conditioning (HVAC) system in the refrigerant loop from an occupant of the vehicle and on an ambient temperature outside the vehicle.

3. The system according to claim 1, wherein, based on the controller determining that the current amount of heat transfer in the chiller is not less than the target amount, the controller is configured to determine if the coolant pump is configured to maximize the flow of the coolant into the second part of the chiller and if the superheat value is less than a maximum superheat value, the maximum superheat value being a predefined value.

4. The system according to claim 3, wherein, based on determining that the current amount of heat transfer in the chiller is greater than the target amount and the superheat value is less than the maximum superheat value, the controller is configured to control the EXV to reduce the flow of the refrigerant into the first part of the chiller.

5. The system according to claim 3, wherein, based on determining that the current amount of heat transfer in the chiller is not greater than the target amount or the superheat value is not less than the maximum superheat value, the controller is configured to control the coolant pump to reduce the flow of the coolant into the second part of the chiller and to control the EXV to bring the superheat value within a predefined range, a maximum value of the predefined range being less than the maximum superheat value.

6. The system according to claim 1, wherein the controller is configured to determine if the target amount for the heat transfer is less than a maximum potential heat transfer amount, the maximum potential heat transfer amount being a maximum potential amount of waste heat in the coolant loop that transfers heat to the coolant.

7. The system according to claim 6, wherein, based on determining that the target amount for the heat transfer is less than the maximum potential heat transfer amount, the controller is configured to control the coolant pump to increase the flow of coolant into the second part of the chiller and to then bring the superheat value within the predefined range.

8. The system according to claim 6, wherein, based on determining that the target amount for the heat transfer is not less than the maximum potential heat transfer amount, the controller is configured to control an electric heat source to transfer heat to the coolant.

9. A method of performing thermal management in a vehicle, the method comprising:
  obtaining, using a processor, a passenger cabin temperature setting;
  determining, using the processor, a target output for a chiller based on the temperature setting, wherein the target output is a target thermal energy transfer amount in a chiller from a coolant that circulates in a coolant loop to a refrigerant that circulates in a refrigerant loop;
  controlling, using the processor, an electronic expansion valve (EXV) in the refrigerant loop configured to control a flow of the refrigerant into a first part of the chiller and a coolant pump in the coolant loop configured to control a flow of the coolant into a second part of the chiller based on the target output;
  determining whether a current amount of heat transfer in the chiller is less than the target output; and
  based on the controller determining that the current amount of heat transfer in the chiller is less than the target output, controlling the EXV to bring a superheat value within a predefined range, the superheat value being a temperature increase of the refrigerant in a vapor phase.

10. The method according to claim 9, wherein the determining the target output is based on an input to a heating, ventilation, and air conditioning (HVAC) system in the refrigerant loop from an occupant of the vehicle and on an ambient temperature outside the vehicle.

11. The method according to claim 9, further comprising, based on the determining that the current amount of heat transfer in the chiller is not less than the target output, determining if the coolant pump is configured to maximize the flow of the coolant into the second part of the chiller and if the superheat value is less than a maximum superheat value, wherein the maximum superheat value is a predefined value.

12. The method according to claim 11, further comprising, based on determining that the current amount of heat transfer in the chiller is greater than the target output and the superheat value is less than the maximum superheat value, controlling the EXV to reduce the flow of the refrigerant into the first part of the chiller.

13. The method according to claim 11, further comprising, based on determining that the current amount of heat transfer in the chiller is not greater than the target output or the superheat value is not less than the maximum superheat value, controlling the coolant pump to reduce the flow of the coolant into the second part of the chiller and to control the EXV to bring the superheat value within a predefined range, wherein a maximum value of the predefined range is less than the maximum superheat value.

14. The method according to claim 9, further comprising determining if the target output is less than a maximum potential heat transfer amount, the maximum potential heat transfer amount being a maximum potential amount of waste heat in the coolant loop that transfers heat to the coolant.

15. The method according to claim 14, further comprising, based on determining that the target output is less than the maximum potential heat transfer amount, controlling the coolant pump to increase the flow of coolant into the second part of the chiller and bringing the superheat value within the predefined range.

16. The method according to claim 14, further comprising, based on determining that the target output is not less than the maximum potential heat transfer amount, controlling an electric heat source to transfer heat to the coolant.

\* \* \* \* \*